(12) United States Patent
Zhang et al.

(10) Patent No.: US 11,080,349 B1
(45) Date of Patent: Aug. 3, 2021

(54) GEO-ENCODED EMBEDDINGS

(71) Applicant: Facebook, Inc., Menlo Park, CA (US)

(72) Inventors: Zhong Zhang, Santa Clara, CA (US);
Jin Fang, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 717 days.

(21) Appl. No.: 15/981,724

(22) Filed: May 16, 2018

(51) Int. Cl.
*G06N 5/04* (2006.01)
*G06F 16/9535* (2019.01)
*G06N 20/00* (2019.01)

(52) U.S. Cl.
CPC ........... *G06F 16/9535* (2019.01); *G06N 5/04* (2013.01); *G06N 20/00* (2019.01)

(58) Field of Classification Search
None
See application file for complete search history.

(56) References Cited

PUBLICATIONS

Grangier, et al., Feature Set Embedding for Incomplete Data, Advances in Neural Information Processing Systems 23 (NIPS 2010), 2010, pp. 1-9 (Year: 2010).*

Gong, et al., A Multi-View Embedding Space for Modeling Internet Images, Tags, and their Semantics, arXiv:1212.4522, 2012, pp. 1-24 (Year: 2012).*

* cited by examiner

*Primary Examiner* — Wilbert L Starks
(74) *Attorney, Agent, or Firm* — Baker Botts L.L.P.

(57) ABSTRACT

In one embodiment, a method includes generating embeddings for social-networking entities by training the embeddings using a training algorithm, where an embedding corresponding to an entity represents a point in a d-dimensional embedding space, identifying a subset of entities having one or more common attributes that is not encoded in the generated embeddings, encoding, for each entity in the subset, values of the one or more common attributes into a j-dimensional additional embedding, creating, for each entity in the subset, a (d+j)-dimensional embedding by concatenating the generated d-dimensional embedding with the j-dimensional additional embedding, detecting a need to identify entities similar to a reference entity that is a member of the subset, computing k-nearest neighbors of an embedding corresponding to the reference entity in the (d+j)-dimensional embedding space, identifying entities corresponding to the computed k-nearest neighbors, and providing information regarding the corresponding entities.

20 Claims, 9 Drawing Sheets

400

410 — generating embeddings for social-networking entities by training the embeddings using a training algorithm, wherein an embedding corresponding to an entity represents a point in a $d$-dimensional embedding space, and wherein contextually similar entities are represented by embeddings close to each other in the embedding space 420 — identifying a subset of entities having one or more common attributes that is not encoded in the generated embeddings 430 — encoding, for each entity in the subset, values of the one or more common attributes into a $j$-dimensional additional embedding 440 — creating, for each entity in the subset, a $(d+j)$-dimensional embedding by concatenating the generated $d$-dimensional embedding with the $j$-dimensional additional embedding 450 — detecting a need to identify entities similar to a reference entity that is a member of the subset 460 — computing $k$-nearest neighbors of an embedding corresponding to the reference entity in the $(d+j)$-dimensional embedding space 470 — identifying entities corresponding to the computed $k$-nearest neighbors 480 — providing information regarding the corresponding entities

*FIG. 4*

GEO-ENCODED EMBEDDINGS

TECHNICAL FIELD

This disclosure generally relates to generating entity embeddings.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a social-networking system may generate geo-encoded entity embeddings. An entity embedding may be a vector representation of the corresponding entity as a point in a d-dimensional embedding space. When two entities are similar to each other, their corresponding embeddings may be trained to be close to each other. When a user encounters an entity associated with a particular geo-location (e.g., an event, a place, etc.), the user may be interested in similar entities nearby. The social-networking system may utilize entity embeddings to find similar entities for a given entity. Entity embeddings may be trained either with a content-based training algorithm or an interaction-based training algorithm. Because the embeddings may be trained globally across the social-networking system, the entity embeddings may not carry geo-location information. As an example and not by way of limitation, an entity embedding corresponding to a Spanish Tapas restaurant in San Francisco may be close to an entity embedding corresponding to a Spanish Tapas restaurant in New York as long as their serving menus are similar, and the customers' feedbacks on the restaurants are similar. Ranking the similar entities based on respective distances from the reference entity may not be easy with currently available entity embeddings. A system and method for generating geo-encoded entity embeddings that carry geo-location information is proposed. The geo-encoded embeddings may allow the social-networking system to find nearby similar entities with little computational complexity and thereby to present most relevant (from both contents and location perspective) entities to the user. The social-networking system may generate entity embeddings by training the embeddings. To generates the entity embeddings, One of two major training algorithms may be used: Content-based training algorithms may train embeddings based on associated content of entities. If two entities are associated with similar content, those entities may be represented close to each other in the embedding space. Interaction-based training algorithms may train embeddings based on interactions the entities may have with each other. As an example and not by way of limitation, if an entity A is connected to another entity B in a social graph, the entities A and B may be represented close to each other in the embedding space. Regardless of training algorithm used to generate entity embeddings, the generated entity embeddings may be useful to measure similarity of any given two entities. The social-networking system may determine, for each unique entity, whether the entity is associated with a particular geo-location. In response to the determination, the social-networking system may convert the latitude and longitude of the particular geo-location into Earth-Centered, Earth-Fixed (ECEF) coordinates. The ECEF coordinates may represent a geo-location position as X, Y, and Z coordinates. The point (0,0,0) is defined as the center of mass of the earth. The X-axis may intersect the sphere of the earth at 0 degree latitude (the equator) and 0 degree longitude (prime meridian in Greenwich). The Z-axis may extend through true north. The Y-axis may complete the right-handed coordinate system, passing through the equator and 90 degree longitude. The ECEF coordinates may be normalized to have values between $[-1, 1]$. The social-networking system may generate a geo-encoded entity embeddings by concatenating the generated entity embedding with the (normalized) ECEF coordinates. If the initially generated entity embeddings are represented in d-dimensional embedding space, the geo-encoded entity embeddings may be represented in (d+3)-dimensional embedding space. Before concatenating the entity embeddings and the ECEF coordinates, the social-networking system may multiply a geo-weight, a, to the ECEF coordinates. The geo-weight may be a tunable parameter to trade off locality and global similarity between entities. The social-networking system may detect that a user is accessing information for an entity. Then, the social-networking system may determine that the user may be interested in other similar entities nearby based on a particular user interface, user behavior patterns or any suitable signals indicating that the user may be interested in similar entities nearby. The social-networking system may compute K-nearest neighbors (KNN) of a geo-encoded embedding corresponding to the entity the user is accessing in the geo-encoded embedding space. The social-networking system may present the user entities corresponding to the K-nearest neighbors. To compute K-nearest neighbors fast and efficiently, the social-networking system may index entity id's and their corresponding approximate nearest neighbors. In particular embodiments, the social-networking system may cluster the embeddings in the embedding space and then find KNN for the given embedding within a cluster.

In particular embodiments, the social-networking system may identify a particular subset of entities, where the entities in the subset are associated with a type of additional information not encoded in the d-dimensional embeddings. The social-networking system may, for each entity in the subset, encode the type of additional information to a j-dimensional additional embedding space and generate an additional-information-encoded entity embedding by concatenating the d-dimensional embedding with the j-dimensional additional embedding. As an example and not by way of limitation, a subset of entities may be associated with a specific time (e.g., a concert associated with a performance time and date, a restaurant associated with the opening date, a person associated with the birthday, and etc.). The social-networking system may, for each entity in the subset, encode the associated time into a j-dimensional embedding. The social-networking system may generate time-encoded embeddings by concatenating the trained d-dimensional embeddings with the j-dimensional embeddings. When a user is accessing an entity, the social-networking system may present the user similar entities associated with close time. More than one additional-information encodings may also be utilized. As an example and not by way of limitation, an entity embedding may be encoded with geo-location information and time information.

In particular embodiments, a social-networking system may generate embeddings for social-networking entities by training the embeddings using a training algorithm. The social-networking entities may be represented by nodes in a social graph that may comprise a plurality of nodes and a plurality of edges connecting the nodes, where each of the edges between two of the nodes may represent a single degree of separation between them. An embedding corresponding to an entity may represent a point in a d-dimensional embedding space. Contextually similar entities may be represented by embeddings close to each other in the embedding space. In particular embodiments, the training algorithm may be a content-based training algorithm. In particular embodiments, the training algorithm may be an interaction-based training algorithm. The social-networking system may identify a subset of entities being associated with a particular geographic location. The social-networking system may, for each entity in the subset, convert latitude and longitude of the particular geographic location into Earth-Centered, Earth-Fixed (ECEF) coordinates. The social-networking system may encode the ECEF coordinates into a j-dimensional additional embedding. The social-networking system may create, for each entity in the subset, a (d+j)-dimensional embedding by concatenating the generated d-dimensional embedding with the j-dimensional additional embedding. In particular embodiments, the social-networking system may multiply a weight to the j-dimensional additional embedding before concatenating the generated d-dimensional embedding with the j-dimensional additional embedding. The weight may be an adjustable parameter determining significance of the associated geographic location in comparison to global similarity encoded by d-dimensional embeddings. In particular embodiments, the social-networking system may detect that a user is accessing information for a reference entity that is a member of the subset. The social-networking system may determine that the user is interested in similar entities based on a particular user interface the user is accessing. In particular embodiments, the social-networking system may determine that the user is interested in similar entities based on previous behavior patterns of the user. In particular embodiments, the social-networking system may determine that the user is interested in similar entities based on signals indicating that the user is interested in similar entities. Based on the determination that the user is interested in similar entities, the social-networking system may detect a need to identify entities similar to the reference entity. The social-networking system may compute k-nearest neighbors of an embedding corresponding to the reference entity in the (d+j)-dimensional embedding space. The social-networking system may index entity identifiers and their corresponding approximate nearest neighbors to enable fast and efficient computing of k-nearest neighbors for a given entity. In particular embodiments, the social-networking system may cluster embeddings in the (d+j)-dimensional embedding space into n clusters and compute k-nearest neighbors of a given embedding within a cluster. The social-networking system may identify entities corresponding to the computed k-nearest neighbors. The social-networking system may provide information regarding the corresponding entities to the user. In particular embodiments, the social-networking system may identify a subset of entities being associated with a particular time instance. The social-networking system may, for each entity in the subset, encode the particular date and time to a j-dimensional additional embedding and create a (d+j)-dimensional embedding by concatenating the generated d-dimensional embedding with the j-dimensional additional embedding.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates an example method for presenting similar entities nearby for a given reference entity.

DESCRIPTION OF EXAMPLE EMBODIMENTS

Figure 1:
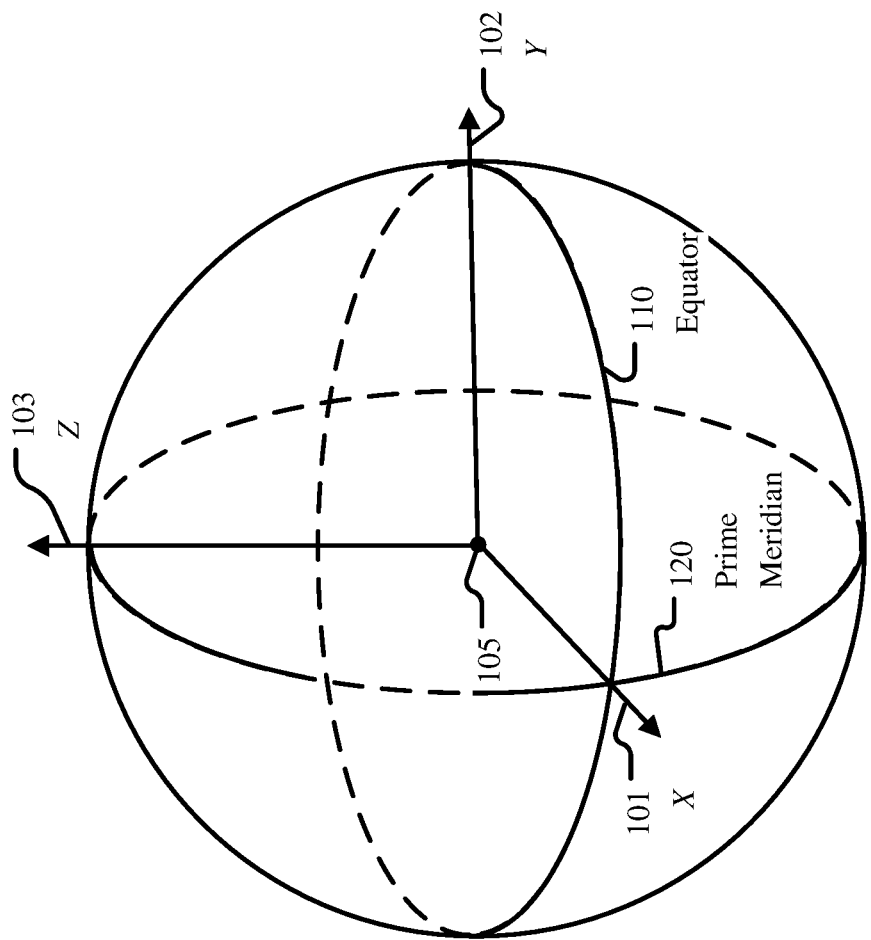
FIG. 1 illustrates an example Earth-Centered, Earth-Fixed (ECEF) coordinates system.

In particular embodiments, a social-networking system 560 may generate geo-encoded entity embeddings. An entity embedding may be a vector representation of the corresponding entity as a point in a d-dimensional embedding space. When two entities are similar to each other, their corresponding embeddings may be trained to be close to each other. When a user encounters an entity associated with a particular geo-location (e.g., an event, a place, etc.), the user may be interested in similar entities nearby. The social-networking system 560 may utilize entity embeddings to find similar entities for a given entity. Entity embeddings may be trained either with a content-based training algorithm or an interaction-based training algorithm. Because the embeddings may be trained globally across the social-networking system 560, the entity embeddings may not carry geo-location information. As an example and not by way of limitation, an entity embedding corresponding to a Spanish Tapas restaurant in San Francisco may be close to an entity embedding corresponding to a Spanish Tapas restaurant in New York as long as their serving menus are similar, and the customers' feedbacks on the restaurants are similar. Ranking the similar entities based on respective distances from the reference entity may not be easy with currently available entity embeddings. A system and method for generating geo-encoded entity embeddings that carry geo-location information is proposed. The geo-encoded embeddings may allow the social-networking system 560 to find nearby similar entity with little computational complexity and thereby to present most relevant (from both contents and location perspective) entities to the user. The social-networking system 560 may generate entity embeddings by training the embeddings. To generates the entity embeddings, One of two major training algorithms may be used: Content-based training algorithms may train embeddings based on associated content of entities. If two entities are associated with similar content, those entities may be represented close to each other in the embedding space. Interaction-based training algorithms may train embeddings based on interactions the entities may have with each other. As an example and not by way of limitation, if an entity A is connected to another entity B in a social graph, the entities A and B may be represented close to each other in the embedding space. Regardless of training algorithm used to generate entity embeddings, the generated entity embeddings may be useful to measure similarity of any given two entities. The social-networking system 560 may determine, for each unique entity, whether the entity is associated with a particular geo-location. In response to the determination, the social-networking system 560 may convert the latitude and longitude of the particular geo-location into Earth-Centered, Earth-Fixed (ECEF) coordinates. The ECEF coordinates may represent a geo-location position as X, Y, and Z coordinates. The point (0,0,0) is defined as the center of mass of the earth. The X-axis may intersect the sphere of the earth at 0 degree latitude (the equator) and 0 degree longitude (prime meridian in Greenwich). The Z-axis may extend through true north. The Y-axis may complete the right-handed coordinate system, passing through the equator and 90 degree longitude. The ECEF coordinates may be normalized to have values between [−1, 1]. The social-networking system 560 may generate a geo-encoded entity embeddings by concatenating the generated entity embedding with the (normalized) ECEF coordinates. If the initially generated entity embeddings are represented in d-dimensional embedding space, the geo-encoded entity embeddings may be represented in (d+3)-dimensional embedding space. Before concatenating the entity embeddings and the ECEF coordinates, The social-networking system 560 may multiply a geo-weight, $\lambda$, to the ECEF coordinates. The geo-weight may be a tunable parameter to trade off locality and global similarity between entities. The social-networking system 560 may detect that a user is accessing information for an entity. Then, the social-networking system 560 may determine that the user may be interested in other similar entities nearby based on a particular user interface, user behavior patterns or any suitable signals indicating that the user may be interested in similar entities nearby. The social-networking system 560 may compute K-nearest neighbors (KNN) of a geo-encoded embedding corresponding to the entity the user is accessing in the geo-encoded embedding space. The social-networking system 560 may present the user entities corresponding to the K-nearest neighbors. To compute K-nearest neighbors fast and efficiently, the social-networking system 560 may index entity id's and their corresponding approximate nearest neighbors. In particular embodiments, the social-networking system 560 may cluster the embeddings in the embedding space and then find KNN for the given embedding within a cluster. Although this disclosure describes generating geo-encoded entity embeddings in a particular manner, this disclosure contemplates generating geo-encoded entity embeddings in any suitable manner.

In particular embodiments, the social-networking system 560 may identify a particular subset of entities, where the entities in the subset are associated with a type of additional information not encoded in the d-dimensional embeddings. The social-networking system 560 may, for each entity in the subset, encode the type of additional information to a j-dimensional additional embedding space and generate an additional-information-encoded entity embedding by concatenating the d-dimensional embedding with the j-dimensional additional embedding. As an example and not by way of limitation, a subset of entities may be associated with a specific time (e.g., a concert associated with a performance time and date, a restaurant associated with the opening date, a person associated with the birthday, and etc.). The social-networking system 560 may, for each entity in the subset, encode the associated time into a j-dimensional embedding. The social-networking system 560 may generate time-encoded embeddings by concatenating the trained d-dimensional embeddings with the j-dimensional embeddings. When a user is accessing an entity, the social-networking system 560 may present the user similar entities associated with close time. More than one additional-information encodings may also be utilized. As an example and not by way of limitation, an entity embedding may be encoded with geo-location information and time information. Although this disclosure describes generating additional-information-encoded entity embeddings in a particular manner, this disclosure contemplates generating additional-information-encoded entity embeddings in any suitable manner.

In particular embodiments, a social-networking system 560 may generate embeddings for social-networking entities by training the embeddings using a training algorithm. The social-networking entities may be represented by nodes in a social graph that may comprise a plurality of nodes and a plurality of edges connecting the nodes, where each of the edges between two of the nodes may represent a single degree of separation between them. An embedding corresponding to an entity may represent a point in a d-dimensional embedding space. Contextually similar entities may be represented by embeddings close to each other in the embedding space. In particular embodiments, the training algorithm may be a content-based training algorithm. In particular embodiments, the training algorithm may be an interaction-based training algorithm. The social-networking system 560 may identify a subset of entities being associated with a particular geographic location. The social-networking system 560 may, for each entity in the subset, convert latitude and longitude of the particular geographic location into Earth-Centered, Earth-Fixed (ECEF) coordinates. The social-networking system 560 may encode the ECEF coordinates into a j-dimensional additional embedding. The social-networking system 560 may create, for each entity in the subset, a (d+j)-dimensional embedding by concatenating the generated d-dimensional embedding with the j-dimensional additional embedding. In particular embodiments, the social-networking system 560 may multiply a weight to the j-dimensional additional embedding before concatenating the generated d-dimensional embedding with the j-dimensional additional embedding. The weight may be an adjustable parameter determining significance of the associated geographic location in comparison to global similarity encoded by d-dimensional embeddings. In particular embodiments, the social-networking system 560 may detect that a user is accessing information for a reference entity that is a member of the subset. The social-networking system 560 may determine that the user is interested in similar entities based on a particular user interface the user is accessing. In particular embodiments, the social-networking system 560 may determine that the user is interested in similar entities based on previous behavior patterns of the user. In particular embodiments, the social-networking system 560 may determine that the user is interested in similar entities based on signals indicating that the user is interested in similar entities. Based on the determination that the user is interested in similar entities, the social-networking system 560 may detect a need to identify entities similar to the reference entity. The social-networking system 560 may compute k-nearest neighbors of an embedding corresponding to the reference entity in the (d+j)-dimensional embedding space. The social-networking system 560 may index entity identifiers and their corresponding approximate nearest neighbors to enable fast and efficient computing of k-nearest neighbors for a given entity. In particular embodiments, the social-networking system 560 may cluster embeddings in the (d+j)-dimensional embedding space into n clusters and compute k-nearest neighbors of a given embedding within a cluster. The social-networking system 560 may identify entities corresponding to the computed k-nearest neighbors. The social-networking system 560 may provide information regarding the corresponding entities to the user. In particular embodiments, the social-networking system 560 may identify a subset of entities being associated with a particular time instance. The social-networking system 560 may, for each entity in the subset, encode the particular date and time to a j-dimensional additional embedding and create a (d+j)-dimensional embedding by concatenating the generated d-dimensional embedding with the j-dimensional additional embedding. Although this disclosure describes generating geo-encoded entity embeddings in a particular manner, this disclosure contemplates generating geo-encoded entity embeddings in any suitable manner.

In particular embodiments, a social-networking system 560 may generate embeddings for social-networking entities by training the embeddings using a training algorithm. The social-networking entities may comprise users, pages, topics, groups, and any suitable entities that may be represented by nodes in a social graph 600. The social graph 600 may comprise a plurality of nodes and a plurality of edges connecting the nodes, where each of the edges between two of the nodes may represent a single degree of separation between them. An embedding corresponding to an entity may represent a point in a d-dimensional embedding space 5500. Contextually similar entities may be represented by embeddings close to each other in the embedding space. In particular embodiments, the training algorithm may be a content-based training algorithm. As an example and not by way of limitation, the social-networking system 560 may collect a corpus of text from the social-networking entities. The social-networking system 560 may generate entity embeddings such that entities having similar content may be located nearby while entities with dissimilar content may be located far from each other. In particular embodiments, the training algorithm may be an interaction-based training algorithm. As an example and not by way of limitation, the social-networking system 560 may collect interactions between entities from the social graph 600. An interaction between two entities may be represented by an edge in the social graph 600. The social-networking system 560 may generate entity embeddings such that entities having one or more interactions (e.g., a user creates a post, the user likes the post) may be located nearby, while entities without interaction between each other may be located far from each other. Although this disclosure describes generating entity embeddings in a particular manner, this disclosure contemplates generating entity embeddings in any suitable manner.

The social-networking system 560 may identify a subset of entities, where the entities are associated with geographic locations. As an example and not by way of limitation, the social-networking system 560 may identify a set of places that are associated with geographic locations. An entity regarding a place may have geographic location information of the place in terms of latitude and longitude coordinates. The social-networking system 560 may, for each entity in the subset, convert the latitude and longitude of the place into Earth-Centered, Earth-Fixed (ECEF) coordinates. FIG. 1 illustrates an example Earth-Centered, Earth-Fixed (ECEF) coordinates system. The ECEF coordinates may represent a geo-location position as x, y, and z coordinates. The point (0,0,0) 105 is defined as the center of mass of the earth. The X-axis 101 may intersect the sphere of the earth at 0 degree latitude (the equator) 110 and 0 degree longitude (prime meridian in Greenwich) 120. The Z-axis 103 may extend through True north. The Y-axis 102 may complete the right-handed coordinate system, passing through the equator 110 and 90 degree longitude. The ECEF coordinates may be normalized to have values between [−1, 1]. As an example and not by way of limitation, the social-networking system 560 may identify a page, whose latitude is 37.484304 and longitude is −122.145815. The social-networking system 560 may convert the latitude and longitude into ECEF coordinates (−2696.275 km, −4290.606 km, 3860.182 km). The social-networking system 560 may normalize the ECEF coordinates to make the values in [−1, 1]. Although this disclosure describes converting latitude and longitude into ECEF coordinates for a social-networking entity associated with a geographic location in a particular manner, this disclosure contemplates converting latitude and longitude into ECEF coordinates for a social-networking entity associated with a geographic location in any suitable manner.

Figure 2:
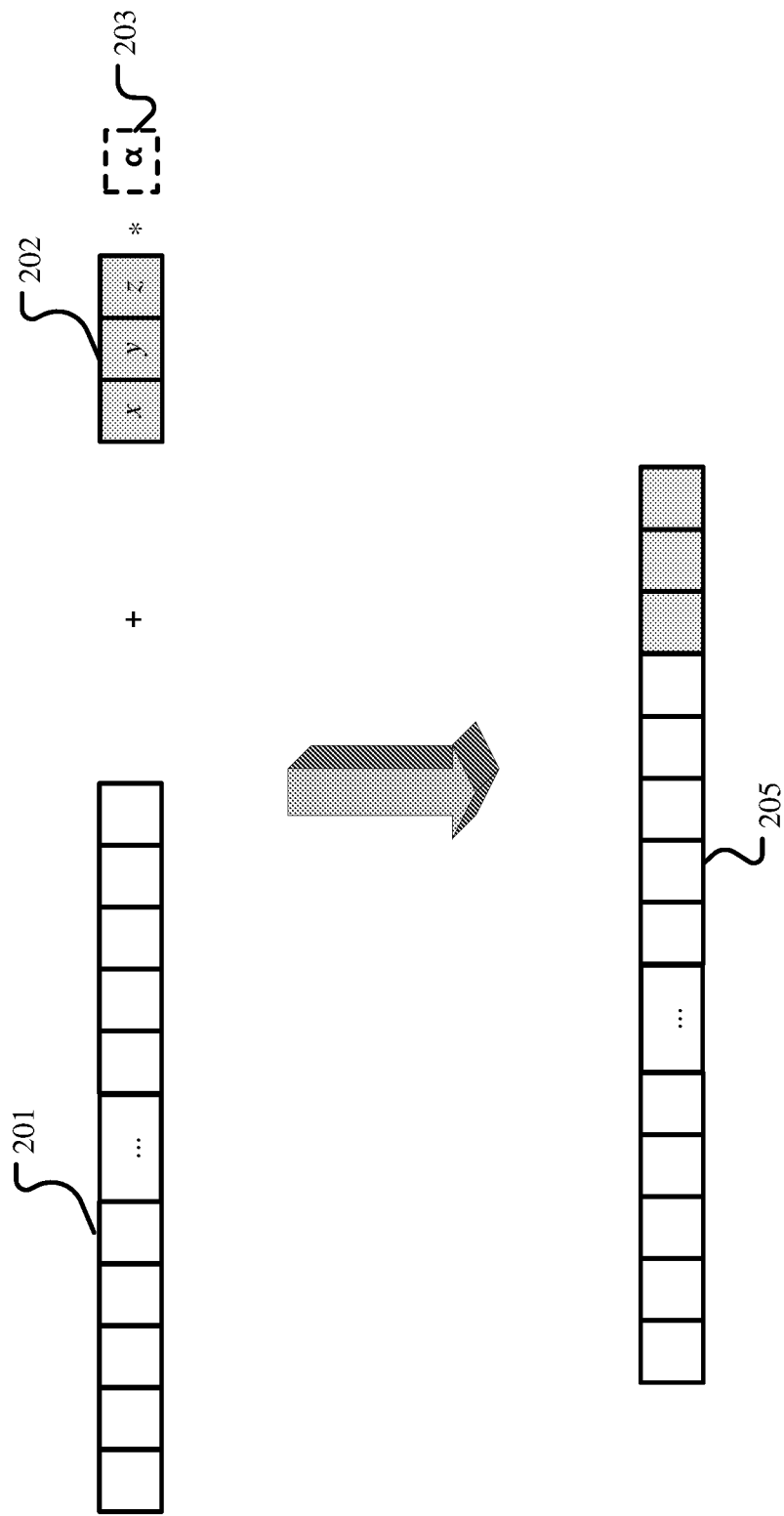
FIG. 2 illustrates an example process of generating a geo-encoded embedding.

FIG. 2 illustrates an example process of generating a geo-encoded embedding. In particular embodiments, the social-networking system 560 may encode the ECEF coordinates into a 3-dimensional additional embedding 202. The social-networking system 560 may create, for each entity in the subset, a (d+3)-dimensional geo-encoded embedding 205 by concatenating the generated d-dimensional embedding 201 with the 3-dimensional additional embedding 202. In particular embodiments, the social-networking system 560 may multiply a weight a 203 to the 3-dimensional additional embedding 202 before concatenating the generated d-dimensional embedding 201 with the 3-dimensional additional embedding 202. The weight a 203 may be an adjustable parameter determining significance of the associated geographic location in comparison to global similarity encoded by d-dimensional embeddings 201. As an example and not by way of limitation, the social-networking system 560 may generate a geo-encoded embedding 205 for Beijing, a Chinese restaurant in Los Angeles, Calif. The social-networking system 560 may create a d-dimensional embedding 201 by running an embedding training algorithm. The social-networking system 560 may determine ECEF coordinates of Beijing by converting the latitude and longitude in the record into the ECEF coordinates. The social-networking system 560 may normalize the ECEF coordinates to make the values in [−1, 1]. The social-networking system 560 may create a 3-dimensional embedding 202 with the normalized ECEF coordinates and multiply 0.5, a geo-weight 203, to the normalized ECEF coordinates in the 3-dimensional embedding. The geo-weight 203 may be a tunable parameter to trade off locality and global similarity between entities. The social-networking system 560 may create a geo-encoded embedding 205 for Beijing by concatenating the d-dimensional embedding 201 with the 3-dimensional embedding 202. The 3-dimensional embedding may comprise ECEF coordinates that are normalized and multiplied by the geo-weight. Although this disclosure describes creating geo-encoded embeddings in a particular manner, this disclosure contemplates creating geo-encoded embeddings in any suitable manner.

Figure 3:
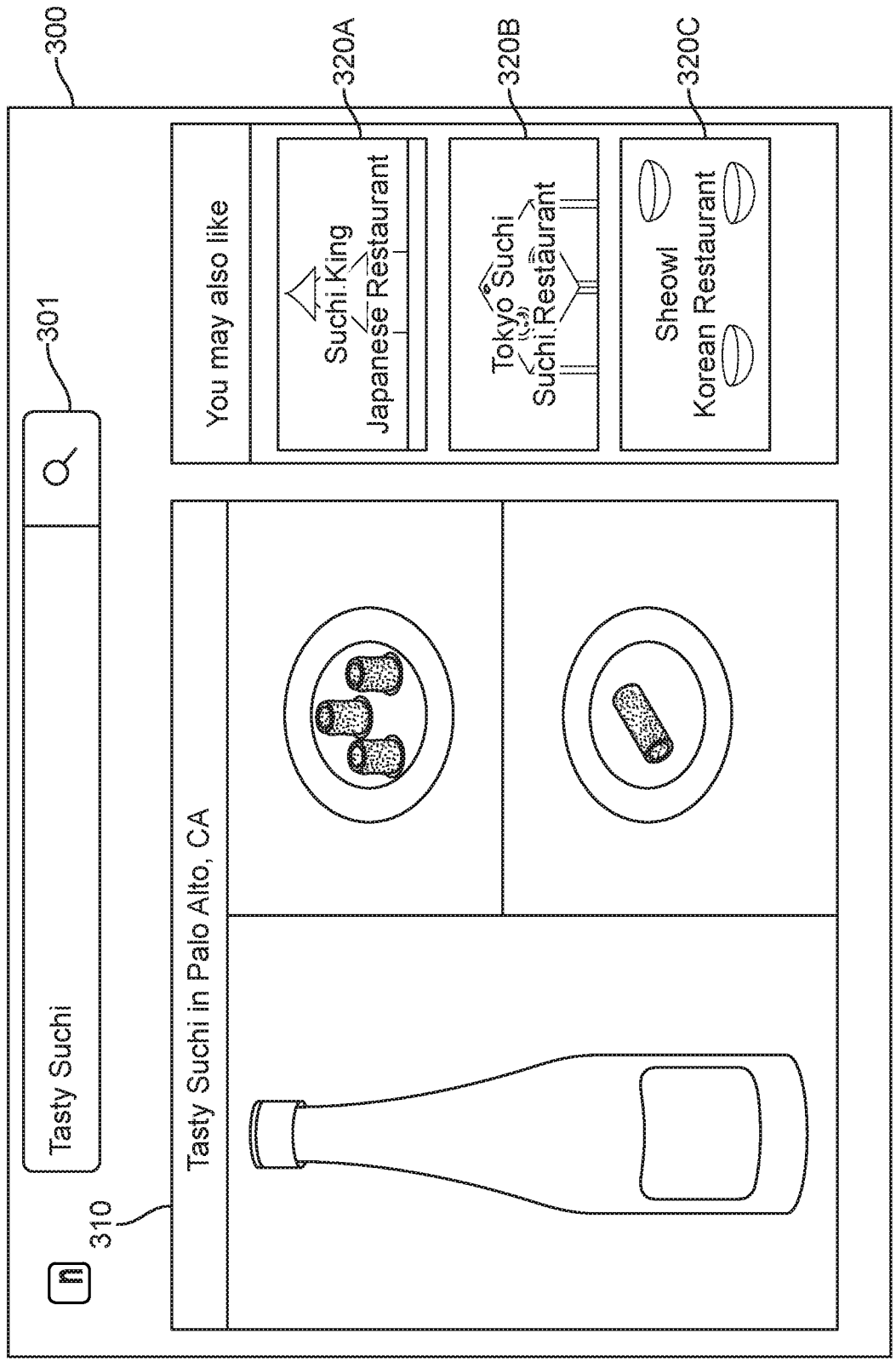
FIG. 3 illustrates an example scenario that a user is accessing information of an entity associated with a geographic location.

In particular embodiments, the social-networking system 560 may detect that a user is accessing information for a reference entity that is a member of the subset. The social-networking system 560 may determine that the user is interested in similar entities based on a particular user interface the user is accessing. As an example and not by way of limitation, a user may be interested in similar entities if the user found an entity using a search interface. In particular embodiments, the social-networking system 560 may determine that the user is interested in similar entities based on previous behavior patterns of the user. As an example and not by way of limitation, the social-networking system 560 may have records of a user indicating that the user has been interested in similar restaurants when the user accesses restaurant information. The social-networking system 560 may determine that the user is interested in similar restaurants if the user is accessing information about a restaurant. In particular embodiments, the social-networking system 560 may determine that the user is interested in similar entities based on signals indicating that the user is interested in similar entities. As an example and not by way of limitation, a user has been looking for event information for rock concerts in an area for more than an hour. The social-networking system 560 may consider that as a signal that the user is interested in other rock concerts available in the area. FIG. 3 illustrates an example scenario that a user is accessing information of an entity associated with a geographic location. In the example illustrated in FIG. 3, a user is accessing the social-networking system 560 with a dedicated application interface 300. The user is searching a sushi restaurant by typing in the search box 301. The social-networking system 560 may display a page 310 for the sushi restaurant located in Palo Alto, Calif., after searching the restaurant from a data store 564. The social-networking system 560 may determine that the user may also be interested in similar restaurants nearby because the user is searching a restaurant. Although this disclosure describes determining that a user is interested in similar entities when the user is accessing information for a reference entity in a particular manner, this disclosure contemplates determining that a user is interested in similar entities when the user is accessing information for a reference entity in any suitable manner.

In particular embodiments, the social-networking system 560 may detect a need to identify entities similar to the reference entity based on the determination that a user is interested in similar entities of a reference entity. The social-networking system 560 may compute k-nearest neighbors of an embedding corresponding to the reference entity in the (d+3)-dimensional geo-encoded embedding space. To enable fast and efficient computing of k-nearest neighbors for a given entity, the social-networking system 560 may index entity identifiers and their corresponding approximate nearest neighbors in advance. When an identifier for the reference entity is identified, the social-networking system 560 may be able to identify k-nearest neighbors by looking up the index. In particular embodiments, the social-networking system 560 may cluster embeddings in the (d+3)-dimensional embedding space into n clusters after generating the (d+3)-dimensional geo-encoded embeddings. When the social-networking system 560 detects a need to identify entities similar to a reference entity, the social-networking system 560 may compute k-nearest neighbors of the embedding corresponding to the reference entity within a cluster that the embedding corresponding to the reference entity belongs to. As an example and not by way of limitation, continuing with the example illustrated in FIG. 3, the social-networking system 560 may compute three nearest neighbors of an embedding corresponding to the restaurant name in the (d+3)-dimensional geo-encoded embedding space. Although this disclosure describes computing k-nearest neighbors of an embedding corresponding the reference entity in a particular manner, this disclosure contemplates computing k-nearest neighbors of an embedding corresponding the reference entity in any suitable manner.

In particular embodiments, the social-networking system 560 may identify entities corresponding to the computed k-nearest neighbors. The social-networking system 560 may provide information regarding the corresponding entities to the user. As an example and not by way of limitation, continuing with the example illustrated in FIG. 3, the social-networking system 560 may identify three restaurants corresponding to the computed three nearest neighbors of the embedding corresponding to the restaurant. Since the identified restaurants are represented close to the restaurant in the (d+3)-dimensional geo-encoded embedding space, the identified restaurants are likely to be in Palo Alto, Calif., where the restaurant is located. The social-networking system 560 may present the identified restaurants, Restaurant A 320A, Restaurant B 320B, and Restaurant C 320C, under the 'You may also like' section. The presented restaurants 320A, 320B, and 320C may have links to their information pages. Although this disclosure describes identifying similar entities of a reference entity and presenting the similar entities to the user in a particular manner, this disclosure contemplates identifying similar entities of a reference entity and presenting the similar entities to the user in any suitable manner.

In particular embodiments, the social-networking system 560 may identify a particular subset of entities, where the entities in the subset are associated with a type of additional information not encoded in the d-dimensional embeddings. The social-networking system may, for each entity in the subset, encode the type of additional information to a j-dimensional additional embedding space and generate an additional-information-encoded entity embedding by concatenating the d-dimensional embedding with the j-dimensional additional embedding. The social-networking system 560 may multiply a weight to the j-dimensional additional embedding before concatenating the d-dimensional embedding with the j-dimensional additional embedding. As another example and not by way of limitation, the social-networking system 560 may identify a subset of entities, each of the entities being associated with a particular time instance. The social-networking system 560 may, for each entity in the subset, encode the particular date and time to a 6-dimensional additional embedding and create a (d+6)-dimensional embedding by concatenating the generated d-dimensional embedding with the 6-dimensional additional embedding. Although this disclosure describes generating an additional-information-encoded entity embedding by concatenating the d-dimensional trained embedding with the j-dimensional additional embedding in a particular manner, this disclosure contemplates generating an additional-information-encoded entity embedding by concatenating the d-dimensional trained embedding with the j-dimensional additional embedding in any suitable manner.

FIG. 4 illustrates an example method 400 for presenting similar entities nearby for a given reference entity. The method may begin at step 410, where the social-networking system 560 may generate embeddings for social-networking entities by training the embeddings using a training algorithm, wherein an embedding corresponding to an entity represents a point in a d-dimensional embedding space, and wherein contextually similar entities are represented by embeddings close to each other in the embedding space. At step 420, the social-networking system 560 may identify a subset of entities having one or more common attributes that is not encoded in the generated embeddings. At step 430, the social-networking system 560 may encod, for each entity in the subset, values of the one or more common attributes into a j-dimensional additional embedding. At step 440, the social-networking system 560 may create, for each entity in the subset, a (d+j)-dimensional embedding by concatenating the generated d-dimensional embedding with the j-dimensional additional embedding. At step 450, the social-networking system 560 may detect a need to identify entities similar to a reference entity that is a member of the subset. Particular embodiments may repeat one or more steps of the method of FIG. 4, where appropriate. At step 460, the social-networking system 560 may compute k-nearest neighbors of an embedding corresponding to the reference entity in the (d+j)-dimensional embedding space. At step 470, the social-networking system 560 may identify entities corresponding to the computed k-nearest neighbors. At step 480, the social-networking system 560 may provide information regarding the corresponding entities. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for presenting similar entities nearby for a given reference entity including the particular steps of the method of FIG. 4, this disclosure contemplates any suitable method for presenting similar entities nearby for a given reference entity including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

System Overview

Figure 5:
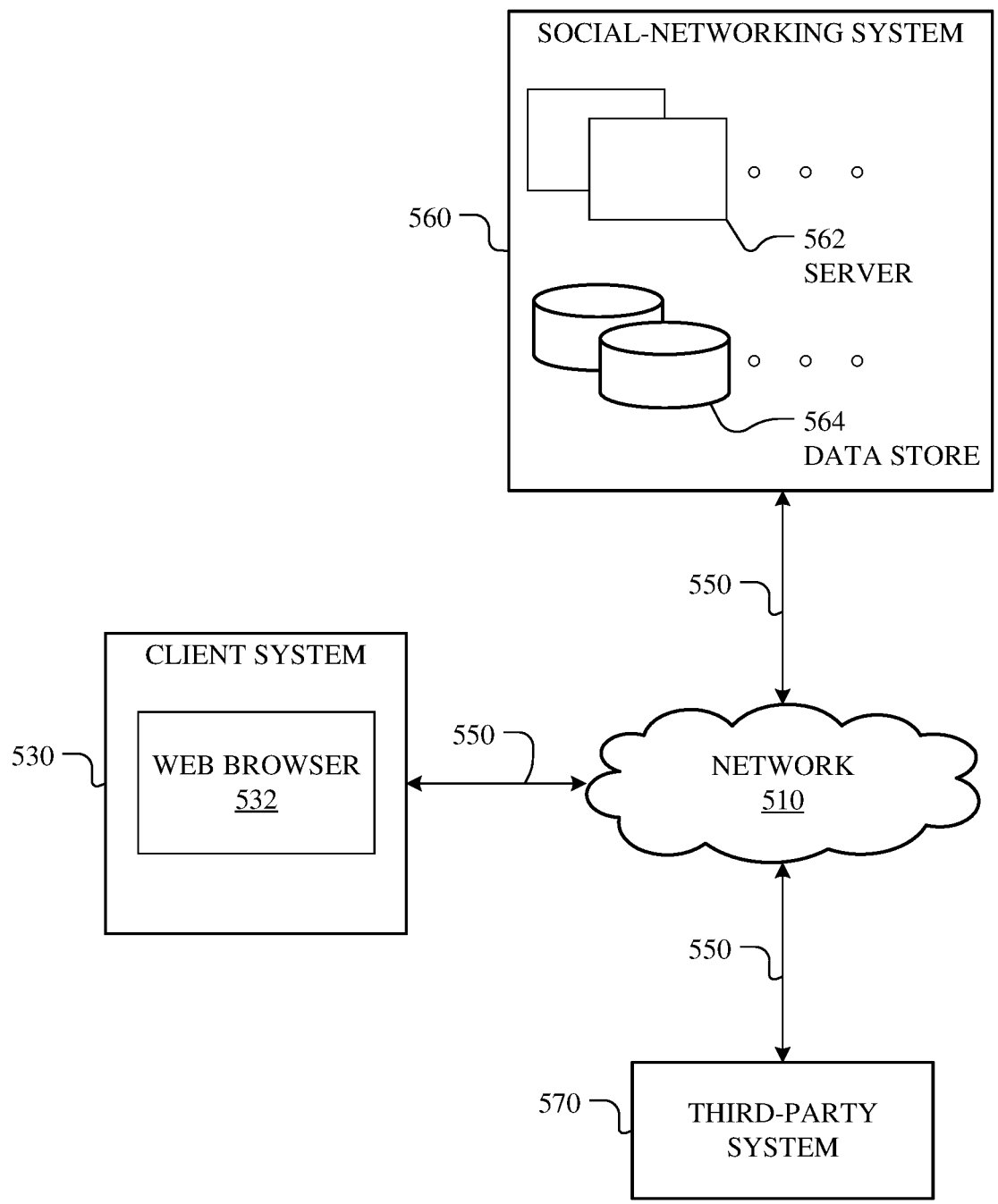
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Social Graphs

Figure 6:
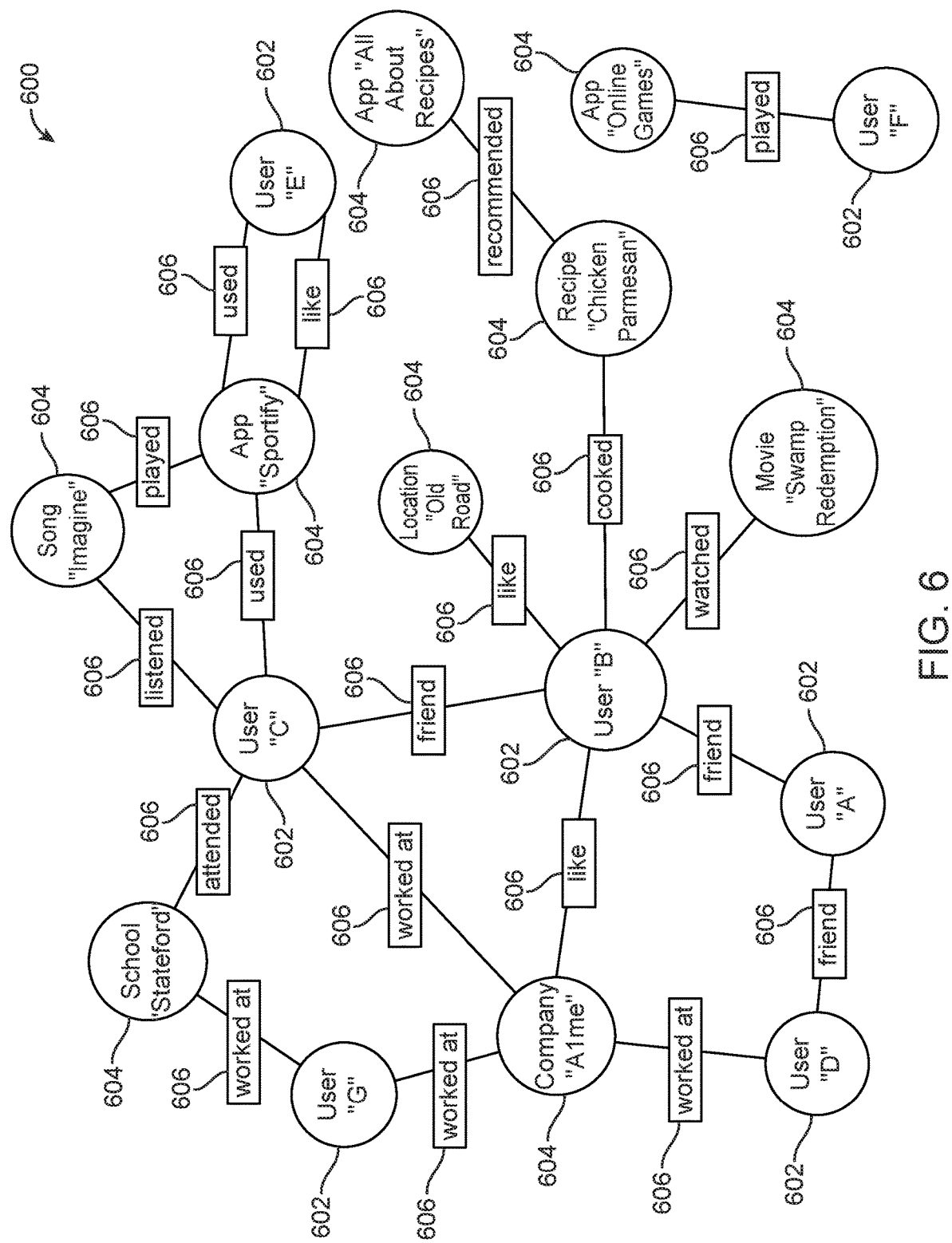
FIG. 6 illustrates an example social graph.

FIG. 6 illustrates example social graph 600. In particular embodiments, social-networking system 560 may store one or more social graphs 600 in one or more data stores. In particular embodiments, social graph 600 may include multiple nodes—which may include multiple user nodes 602 or multiple concept nodes 604—and multiple edges 606 connecting the nodes. Each node may be associated with a unique entity (i.e., user or concept), each of which may have a unique identifier (ID), such as a unique number or user-name. Example social graph 600 illustrated in FIG. 6 is shown, for didactic purposes, in a two-dimensional visual map representation. In particular embodiments, a social-networking system 560, client system 530, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 560. In particular embodiments, a user node 602 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 560. Profile pages may also be hosted on third-party websites associated with a third-party system 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 530 to send to social-networking system 560 a message indicating the user's action. In response to the message, social-networking system 560 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 560 may send a "friend request" to the second user. If the second user confirms the "friend request," social-networking system 560 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606. The degree of separation between two objects represented by two nodes, respectively, is a count of edges in a shortest path connecting the two nodes in the social graph 600. As an example and not by way of limitation, in the social graph 600, the user node 602 of user "C" is connected to the user node 602 of user "A" via multiple paths including, for example, a first path directly passing through the user node 602 of user "B," a second path passing through the concept node 604 of company "Acme" and the user node 602 of user "D," and a third path passing through the user nodes 602 and concept nodes 604 representing school "Stanford," user "G," company "Acme," and user "D." User "C" and user "A" have a degree of separation of two because the shortest path connecting their corresponding nodes (i.e., the first path) includes two edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 560 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 560 may create a "played" edge 606 (as illustrated in FIG. 6) between concept nodes 604 corresponding to the song and the application to indicate that the particular song was played by the particular application. In this case, "played" edge 606 corresponds to an action performed by an external application on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604).

In particular embodiments, social-networking system 560 may create an edge 606 between a user node 602 and a concept node 604 in social graph 600. As an example and not by way of limitation, a user viewing a concept-profile page (such as, for example, by using a web browser or a special-purpose application hosted by the user's client system 530) may indicate that he or she likes the concept represented by the concept node 604 by clicking or selecting a "Like" icon, which may cause the user's client system 530 to send to social-networking system 560 a message indicating the user's liking of the concept associated with the concept-profile page. In response to the message, social-networking system 560 may create an edge 606 between user node 602 associated with the user and concept node 604, as illustrated by "like" edge 606 between the user and concept node 604. In particular embodiments, social-networking system 560 may store an edge 606 in one or more data stores. In particular embodiments, an edge 606 may be automatically formed by social-networking system 560 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

Vector Spaces and Embeddings

Figure 7:
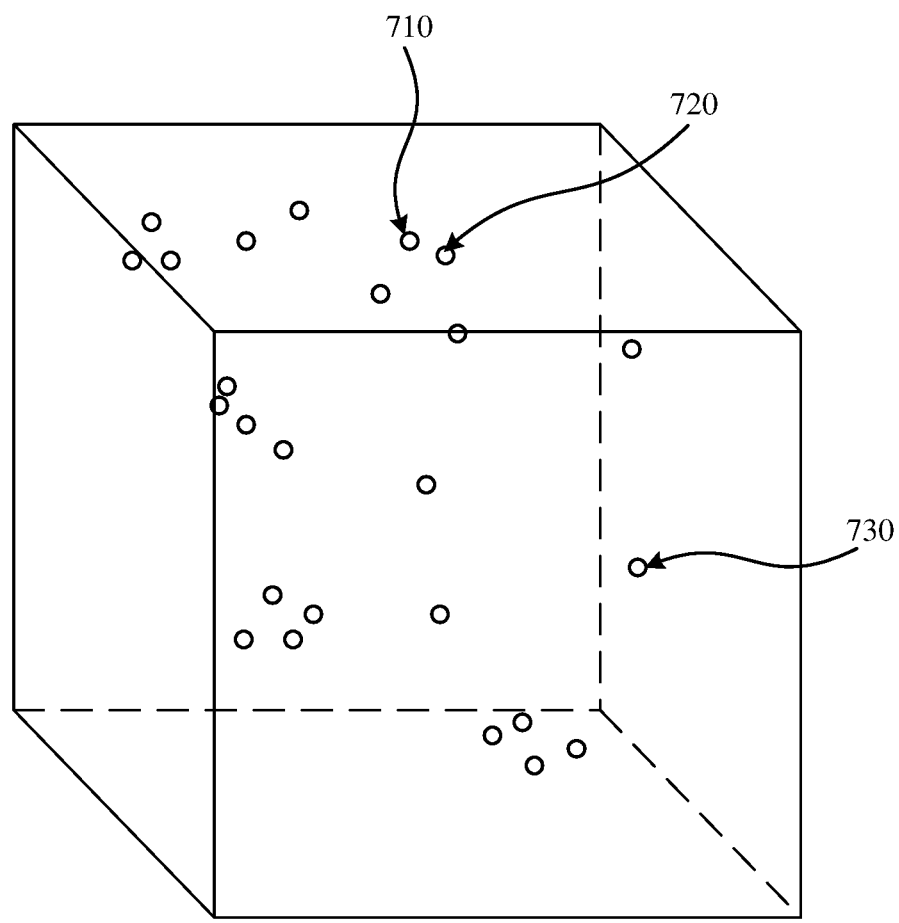
FIG. 7 illustrates an example view of an embedding space.

FIG. 7 illustrates an example view of a vector space 700. In particular embodiments, an object or an n-gram may be represented in a d-dimensional vector space, where d denotes any suitable number of dimensions. Although the vector space 700 is illustrated as a three-dimensional space, this is for illustrative purposes only, as the vector space 700 may be of any suitable dimension. In particular embodiments, an n-gram may be represented in the vector space 700 as a vector referred to as a term embedding. Each vector may comprise coordinates corresponding to a particular point in the vector space 700 (i.e., the terminal point of the vector). As an example and not by way of limitation, vectors 710, 720, and 730 may be represented as points in the vector space 700, as illustrated in FIG. 7. An n-gram may be mapped to a respective vector representation. As an example and not by way of limitation, n-grams $t_1$ and $t_2$ may be mapped to vectors $\vec{v}_1$ and $\vec{v}_2$ in the vector space 700, respectively, by applying a function $\vec{\pi}$ defined by a dictionary, such that $\vec{v}_1 = \vec{\pi}(t_1)$ and $\vec{v}_2 = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 700. In particular embodiments, an n-gram may be mapped to a vector representation in the vector space 700 by using a machine leaning model (e.g., a neural network). The machine learning model may have been trained using a sequence of training data (e.g., a corpus of objects each comprising n-grams).

In particular embodiments, an object may be represented in the vector space 700 as a vector referred to as a feature vector or an object embedding. As an example and not by way of limitation, objects $e_1$ and $e_2$ may be mapped to vectors $\vec{v}_1$ and $\vec{v}_2$ in the vector space 700, respectively, by applying a function $\vec{\pi}$, such that $\vec{v}_1 = \vec{\pi}(e_1)$ and $\vec{v}_2 = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 700. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 700. As an example and not by way of limitation, vector 710 and vector 720 may correspond to objects that are more similar to one another than the objects corresponding to vector 710 and vector 730, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 8:
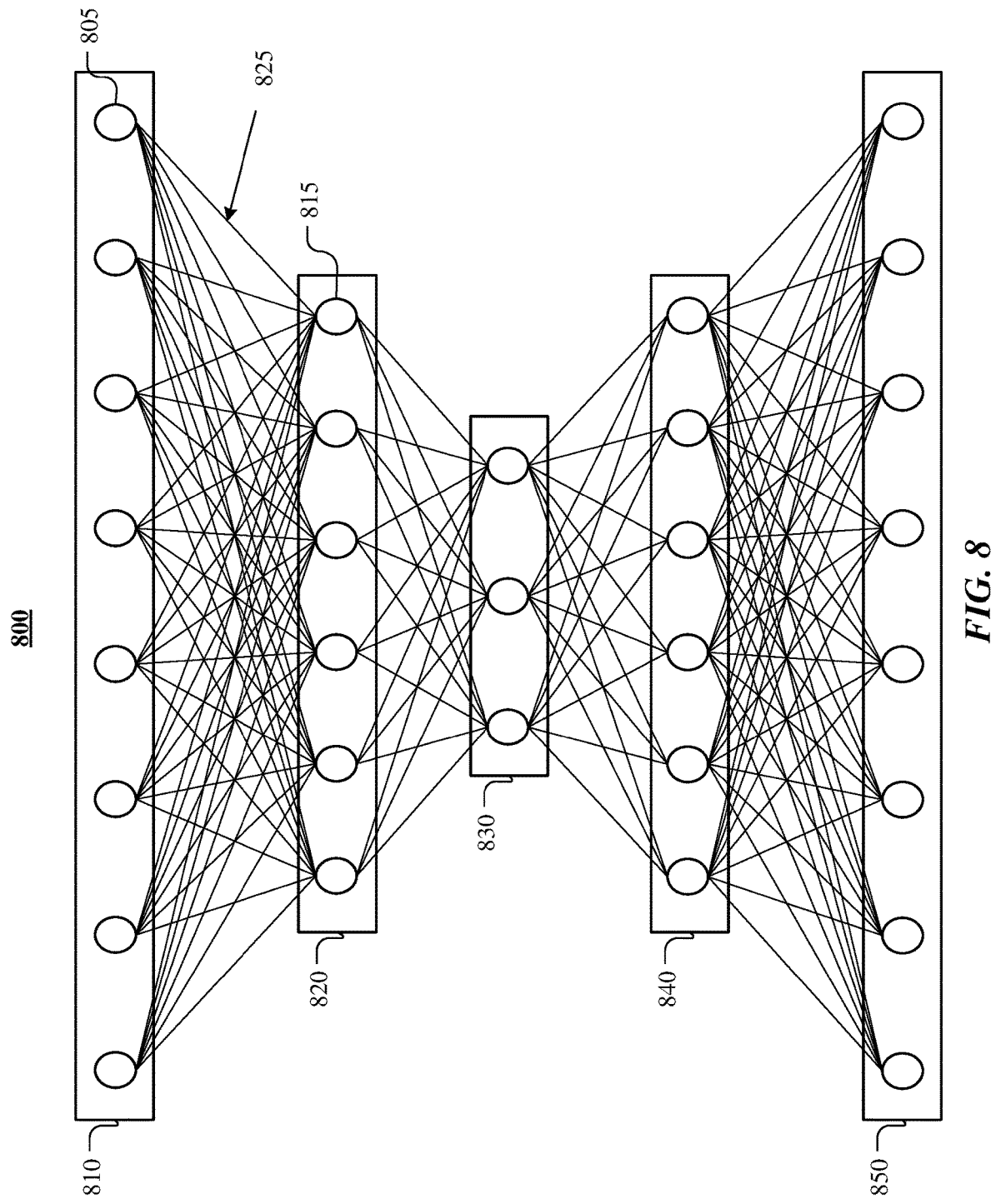
FIG. 8 illustrates an example artificial neural network.

FIG. 8 illustrates an example artificial neural network ("ANN") 800. In particular embodiments, an ANN may refer to a computational model comprising one or more nodes. Example ANN 800 may comprise an input layer 810, hidden layers 820, 830, 840, and an output layer 850. Each layer of the ANN 800 may comprise one or more nodes, such as a node 805 or a node 815. In particular embodiments, each node of an ANN may be connected to another node of the ANN. As an example and not by way of limitation, each node of the input layer 810 may be connected to one of more nodes of the hidden layer 820. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 8 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 8 depicts a connection between each node of the input layer 810 and each node of the hidden layer 820, one or more nodes of the input layer 810 may not be connected to one or more nodes of the hidden layer 820.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 820 may comprise the output of one or more nodes of the input layer 810. As another example and not by way of limitation, the input to each node of the output layer 850 may comprise the output of one or more nodes of the hidden layer 840. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(S_k) = \frac{1}{1+e^{-s_k}},$$

the hyperbolic tangent function $$F_k(S_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 825 between the node 805 and the node 815 may have a weighting coefficient of 0.4, which may indicate that 0.4 multiplied by the output of the node 805 is used as an input to the node 815. As another example and not by way of limitation, the output $y_k$ of node k may be $y_k=F_k(s_k)$, where $F_k$ may be the activation function corresponding to node k, $s_k=\Sigma_j (w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 800 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 604 corresponding to a particular photo may have a privacy setting specifying that the photo may only be accessed by users tagged in the photo and their friends. In particular embodiments, privacy settings may allow users to opt in or opt out of having their actions logged by social-networking system 560 or shared with other systems (e.g., third-party system 570). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 570, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 562 may be authorization/privacy servers for enforcing privacy settings. In response to a request from a user (or other entity) for a particular object stored in a data store 564, social-networking system 560 may send a request to the data store 564 for the object. The request may identify the user associated with the request and may only be sent to the user (or a client system 530 of the user) if the authorization server determines that the user is authorized to access the object based on the privacy settings associated with the object. If the requesting user is not authorized to access the object, the authorization server may prevent the requested object from being retrieved from the data store 564, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 9:
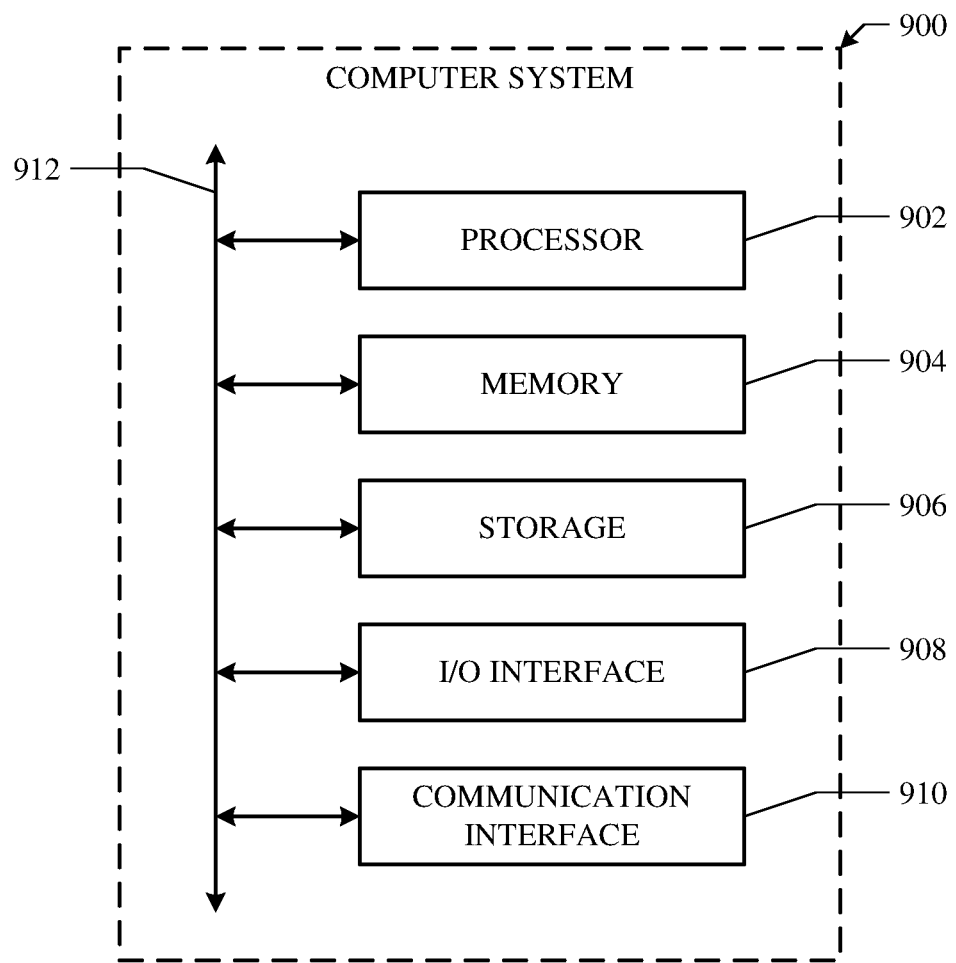
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. The scope of this disclosure encompasses all changes, substitutions, variations, alterations, and modifications to the example embodiments described or illustrated herein that a person having ordinary skill in the art would comprehend.

The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, generating embeddings for social-networking entities by training the embeddings using a training algorithm, wherein an embedding corresponding to an entity represents a point in a d-dimensional embedding space, and wherein contextually similar entities are represented by embeddings close to each other in the embedding space;

by the computing device, identifying a subset of entities having one or more common attributes that is not encoded in the generated embeddings;

by the computing device, encoding, for each entity in the subset, values of the one or more common attributes into a j-dimensional additional embedding;

by the computing device, creating, for each entity in the subset, a (d+j)-dimensional embedding by concatenating the generated d-dimensional embedding with the j-dimensional additional embedding;

by the computing device, detecting a need to identify entities similar to a reference entity that is a member of the subset;

by the computing device, computing k-nearest neighbors of an embedding corresponding to the reference entity in the (d+j)-dimensional embedding space;

by the computing device, identifying entities corresponding to the computed k-nearest neighbors; and by the computing device, providing information regarding the corresponding entities.

2. The method of claim 1, wherein the training algorithm is a content-based training algorithm.

3. The method of claim 1, wherein the training algorithm is an interaction-based training algorithm.

4. The method of claim 1, wherein the one or more common attributes comprise association with a particular geographic location.

5. The method of claim 4, wherein encoding values of the one or more common attributes comprises converting latitude and longitude of the particular geographic location into Earth-Centered, Earth-Fixed (ECEF) coordinates.

6. The method of claim 1, wherein the one or more common attributes comprise association with a particular time instance.

7. The method of claim 6, wherein encoding values of the one or more common attributes comprises encoding a particular date and time to a j-dimensional embedding.

8. The method of claim 1, further comprising multiplying a weight to the j-dimensional additional embedding before concatenating the generated d-dimensional embedding with the j-dimensional additional embedding.

9. The method of claim 8, wherein the weight is an adjustable parameter determining significance of the one or more common attributes in comparison to global similarity encoded by d-dimensional embeddings.

10. The method of claim 1, wherein the detecting a need to identify entities similar to a reference entity comprises:
detecting that a user is accessing information for the reference entity, wherein the reference entity is a member of the subset; and
determining that the user is interested in similar entities.

11. The method of claim 10, wherein the determining is based on a particular user interface the user is accessing.

12. The method of claim 10, wherein the determining is based on previous behavior patterns of the user.

13. The method of claim 10, wherein the determining is based on signals indicating that the user is interested in similar entities.

14. The method of claim 1, further comprising indexing entity identifiers and their corresponding approximate nearest neighbors to enable fast and efficient computing of k-nearest neighbors for a given entity.

15. The method of claim 1, wherein computing k-nearest neighbors of an embedding comprises:

clustering embeddings in the (d+j)-dimensional embedding space into n clusters; and
computing k-nearest neighbors of a given embedding within a cluster.

16. One or more computer-readable non-transitory storage media embodying software that is operable when executed to:
generate embeddings for social-networking entities by training the embeddings using a training algorithm, wherein an embedding corresponding to an entity represents a point in a d-dimensional embedding space, and wherein contextually similar entities are represented by embeddings close to each other in the embedding space;
identify a subset of entities having one or more common attributes that is not encoded in the generated embeddings;
encode, for each entity in the subset, values of the one or more common attributes into a j-dimensional additional embedding;
create, for each entity in the subset, a (d+j)-dimensional embedding by concatenating the generated d-dimensional embedding with the j-dimensional additional embedding;
detect a need to identify entities similar to a reference entity that is a member of the subset;
compute k-nearest neighbors of an embedding corresponding to the reference entity in the (d+j)-dimensional embedding space;
identify entities corresponding to the computed k-nearest neighbors; and
provide information regarding the corresponding entities.

17. The media of claim 16, wherein the training algorithm is a content-based training algorithm.

18. The media of claim 16, wherein the training algorithm is an interaction-based training algorithm.

19. The media of claim 16, wherein the one or more common attributes comprise association with a particular geographic location.

20. A system comprising:
one or more processors; and
one or more computer-readable non-transitory storage media coupled to one or more of the processors and comprising instructions operable when executed by one or more of the processors to cause the system to:
generate embeddings for social-networking entities by training the embeddings using a training algorithm, wherein an embedding corresponding to an entity represents a point in a d-dimensional embedding space, and wherein contextually similar entities are represented by embeddings close to each other in the embedding space;
identify a subset of entities having one or more common attributes that is not encoded in the generated embeddings;
encode, for each entity in the subset, values of the one or more common attributes into a j-dimensional additional embedding;
create, for each entity in the subset, a (d+j)-dimensional embedding by concatenating the generated d-dimensional embedding with the j-dimensional additional embedding;
detect a need to identify entities similar to a reference entity that is a member of the subset;
compute k-nearest neighbors of an embedding corresponding to the reference entity in the (d+j)-dimensional embedding space;

identify entities corresponding to the computed k-nearest neighbors; and provide information regarding the corresponding entities.

* * * * *